Jan. 23, 1934.    J. BERTSCHI    1,944,487
ELECTROMAGNETIC VIBRATORY MOTOR

Filed July 3, 1933

Inventor:
Jacob Bertschi,
By Churchill Parker Carlson
Attys.

Patented Jan. 23, 1934

1,944,487

UNITED STATES PATENT OFFICE 1,944,487

ELECTROMAGNETIC VIBRATORY MOTOR

Jacob Bertschi, Chicago, Ill., assignor to Utah Radio Products Company, Chicago, Ill., a corporation of Illinois Application July 3, 1933. Serial No. 678,810

4 Claims. (Cl. 175—338)

The present invention relates to vibratory motors of the type in which a movable armature is caused to vibrate or oscillate by an intermittent electromagnetic force and the invention has, as its general aim, the provision of a device of this character which is exceedingly quiet in operation.

Another object of the invention is to provide a vibratory motor embodying a novel arrangement of parts for quieting the noise, and particularly the mechanical noise, which is incident to the operation of such devices.

A further object is to provide a device of this nature in which the operating mechanism is resiliently supported in a novel manner so that operating vibrations are dampened and not transmitted.

More particularly stated an object resides in the provision of vibratory motor mechanism housed and mounted within a casing and supported thereon by a resilient member which permits the mechanism to vibrate as a whole as an incident to armature vibration.

Other objects and advantages will become apparent in the following description and from the accompanying drawing, in which.

Figure 1:
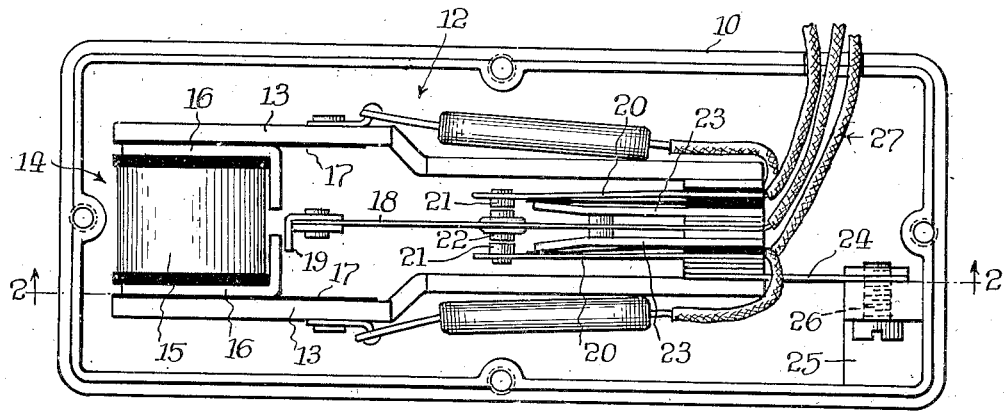
Figure 1 is a plan view of a device embodying the features of the invention, the cover section of the casing being removed.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the drawing, wherein one form of device has been shown merely in illustration of the features of the invention, 10 designates an enclosing casing which is preferably of metal and comprises two interfitting sections secured together as by screws 11.

The casing encloses vibratory mechanism, generally indicated at 12, comprising a self-contained unitary assembly of operating parts. Thus, spaced frame members 13, formed of relatively heavy bars, which preferably are of a non-magnetic metal, have secured therebetween and at one end an electromagnet 14 embodying a winding 15 and L-shaped pole pieces 16 so arranged that a leg of each extends partially across the side of the winding which faces toward the opposite end of the frame. Strips of insulation 17 (Fig. 1) may be interposed between the pole pieces and the frame members.

Secured between the opposite ends of the frame members to extend toward the electromagnet is a flexible leaf spring 18 constituting a vibratory reed which supports on its free end an armature 19 for movement past but always in spaced relation to the ends of the pole pieces 16. The same structure which supports the reed on the frame is also utilized to mount contact fingers 20 on opposite sides of the reed, these fingers being provided with points 21 arranged for alternate engagement by a double point 22 on the reed. The contact fingers are held in properly spaced relation by underlying bumper members 23. Where necessary, the parts are electrically insulated in any suitable manner.

As may be seen in Fig. 1 the armature is normally off center or eccentric with respect to the effective center of magnetic force and the point 22 is normally out of contact with both points 21. Initial energization of the electromagnet is, therefore, effective to move the armature to complete a circuit through one of the points 21 and the double point 22. The circuits of the device include an electromagnetic circuit which is initially closed when the device is connected with a source of current. This electromagnetic circuit is arranged to be shorted or shunted out when a circuit is closed through point 22 and the first engaged point 21. Thereupon, energization of the electromagnet is diminished to a point of substantial inactivity and the armature is free to swing in an opposite direction to establish a circuit through the point 22 and the other point 21.

Figure 2:
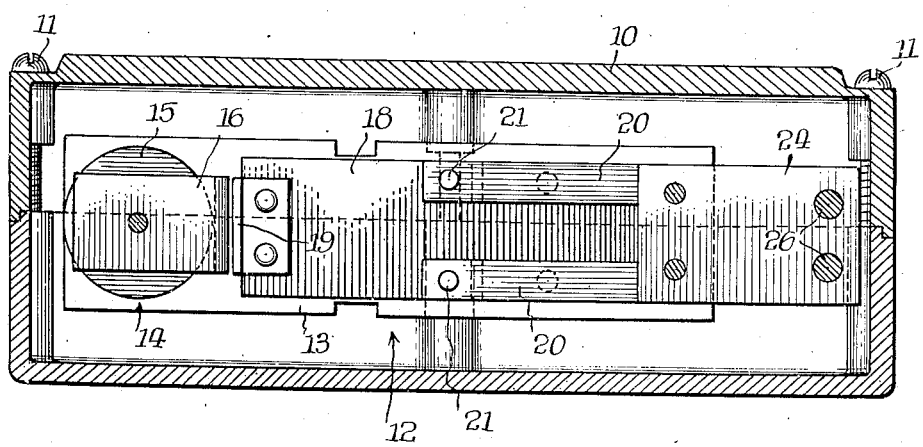
Fig. 2 is a sectional view through the device, taken as indicated by the line 2—2 of Fig. 1.

The structure and arrangement of the several parts, including the electromagnet, reed, and armature assembly, contacts and points, and circuits are more completely disclosed in the copending application of Edward L. Barrett, Serial No. 649,787, filed January 3, 1933. The present motor device, however, is adapted for use in connection with a full wave rectifying system and, as shown in Fig. 2, embodies two complete sets of contact fingers 20 and points 21, 22. This rectifying system forms no part of the present invention and further description is, therefore, unnecessary.

The unitary vibratory mechanism is supported in the casing by resilient means which permits the mechanism to move independently relative to the casing under the influence of the vibrating armature. In this instance, this resilient means comprises a leaf spring 24 which is secured through one end to the supporting frame of the vibratory mechanism preferably by the same means which secures the reed, contact fingers and associated parts in place. A block 25, or the like, rigid with the casing provides a firm base to which the other end of the spring is suitably anchored, as at 26. It is preferred that the planes which the reed and spring occupy be generally parallel and that the vibratory characteristics of these two parts be different so that they will not tend to vibrate in synchronism. Preferably, the electrical leads 27 which pass through the casing are connected with the unit at a point adjacent to the point of connection of the spring with the unit so that these leads do not materially interfere with the free movement of the unit.

As a result of this construction, the mechanical and noise producing vibration which inevitably results in the vibratory unit during operation causes independent movement of the unit relative to the casing as permitted by the spring 24. The parallelism of the reed and spring allows the unit to move freely in generally the same direction as that in which the armature vibrates. The induced vibratory movement of the unit can only be transmitted to the casing through the supporting spring 24, thereby effectively dampening mechanical noise. The differing vibration characteristics of the reed and spring counteract to break up the frequency of vibration and apparently produce vibrations of high frequency which are easily dampened by the casing.

From the foregoing it will be evident that a novel device has been produced in which mechanical noise incident to the operation of the device is effectively eliminated. And where the device is especially adapted, as in this instance, for use in connection with "B" battery eliminator systems for automobile radio receiving apparatus, the advantages of such devices become of exceeding importance.

I claim as my invention:

1. In a vibratory motor, the combination of an enclosing casing, a vibratory motor unit including an electromagnet, a vibratory armature responsive to electromagnet energizations, and supporting means for said electromagnet and armature, and means for supporting said unit from said casing and in spaced relation to the internal walls thereof for independent movement relative to the casing induced by the operation of said unit.

2. A vibratory motor device comprising, in combination, a casing, a vibratory motor unit in said casing including a relatively heavy frame, an electromagnet at one end of said frame, a resiliently supported armature secured at the other end of the frame and disposed within the effective range of said electromagnet, and circuits controlling the operative energization of said electromagnet to cause said armature to vibrate, and a spring member secured to the casing and to the unit at the end thereof on which said armature is mounted and supporting said unit in the casing for independent movement in generally the same direction in which the armature vibrates.

3. A vibratory motor device comprising, in combination, a casing, a vibratory motor unit in said casing including a frame, an electromagnet at one end of said frame, a resiliently supported armature secured at the other end of the frame and disposed within the effective range of said electromagnet, and circuits controlling the operative energization of said electromagnet to cause said armature to vibrate, a spring member secured to the casing and to the unit for supporting said unit for independent movement, and lead wires entering the casing and connecting with the unit adjacent to the point where said unit and spring member are attached together.

4. In a vibratory motor, the combination of an enclosing casing, a vibratory motor unit including an electromagnet, a vibratory armature responsive to electromagnetic energization, and supporting means for said electromagnet and armature, and a unit supporting spring rigid with said casing and said unit for maintaining said unit in spaced relation to the internal walls of the casing for independent movement relative to the casing induced by the operation of said unit.

JACOB BERTSCHI.